United States Patent
Takada et al.

(10) Patent No.: US 8,390,730 B2
(45) Date of Patent: Mar. 5, 2013

(54) IMAGE CAPTURING APPARATUS, CONTROL METHOD THEREOF, AND PROGRAM

(75) Inventors: Yohei Takada, Osaka (JP); Hisamo Sogawa, Hyogo (JP)

(73) Assignee: Sony Corporation (JP)

( * ) Notice: Subject to any disclaimer, the term of this patent is extended or adjusted under 35 U.S.C. 154(b) by 275 days.

(21) Appl. No.: 12/658,175

(22) Filed: Feb. 4, 2010

(65) Prior Publication Data
US 2010/0208127 A1   Aug. 19, 2010

(30) Foreign Application Priority Data
Feb. 12, 2009   (JP) ............................ P2009-029453

(51) Int. Cl.
*H04N 5/232* (2006.01)
*G03B 3/10* (2006.01)

(52) U.S. Cl. ...................................... 348/349; 396/123

(58) Field of Classification Search .................. 348/345, 348/349, 362, 221.1, 348; 396/123; 382/118
See application file for complete search history.

(56) References Cited

U.S. PATENT DOCUMENTS

| | | | | |
|---|---|---|---|---|
| 7,706,675 B2* | 4/2010 | Nozaki et al. | ............... | 396/123 |
| 7,747,159 B2* | 6/2010 | Uenishi | ............... | 396/135 |
| 7,791,668 B2* | 9/2010 | Maeda | ............... | 348/349 |
| 7,945,152 B2* | 5/2011 | Hirai et al. | ............... | 396/123 |
| 2006/0182433 A1 | 8/2006 | Kawahara et al. | | |
| 2007/0242942 A1* | 10/2007 | Nozaki et al. | ............... | 396/123 |
| 2007/0263997 A1* | 11/2007 | Hirai et al. | ............... | 396/123 |
| 2009/0147107 A1 | 6/2009 | Kawahara et al. | | |

FOREIGN PATENT DOCUMENTS

| | | |
|---|---|---|
| JP | 2006-227080 A | 8/2006 |
| JP | 2007225975 A | 9/2007 |
| JP | 2008184165 A | 8/2008 |
| JP | 2008197286 A | 8/2008 |
| JP | 2008287064 A | 11/2008 |

OTHER PUBLICATIONS

Office Action from Japanese Application No. 2009-029453, dated Jul. 31, 2012.

* cited by examiner

*Primary Examiner* — Chieh M Fan
*Assistant Examiner* — Ahmed A Berhan
(74) *Attorney, Agent, or Firm* — Lerner, David, Littenberg, Krumholz & Mentlik, LLP

(57) ABSTRACT

An image capturing apparatus includes an image sensor obtaining a captured image of a subject, a face detection section detecting a face of the subject from the captured image, a focusing control section performing a tracking focusing operation for maintaining a state in which the face of the subject is focused on the basis of a signal obtained from a distance measuring area provided in an image capturing area, a first determination section determining whether the face of the subject is present in the distance measuring area when the face of the subject is detected by the face detection section, and a second determination section determining whether a body area in which a body corresponding to the face of the subject is expected to be present is present in the distance measuring area when the face of the subject is determined not to be present in the distance measuring area.

5 Claims, 11 Drawing Sheets

| OPERATIONAL STATE | DISPLAY OF FRAME | DISPLAY COLOR |
|---|---|---|
| D1: DETECT FACE | FACE FRAME SURROUNDING DETECTED FACE | WHITE |
| D2: SET FACE TO BE TRACKED | FACE FRAME SURROUNDING FACE TO BE TRACKED | ORANGE |
| D3: FOCUS FACE TO BE TRACKED | FACE FRAME SURROUNDING FACE TO BE TRACKED | GREEN |
| D4: FOCUS BODY | NO DISPLAY OR FACE FRAME SURROUNDING FACE TO BE TRACKED | |
| D5: NO FOCUS | NO DISPLAY | |

IMAGE CAPTURING APPARATUS, CONTROL METHOD THEREOF, AND PROGRAM

CROSS-REFERENCE TO RELATED APPLICATION

The present application claims priority from Japanese Patent Application No. JP 2009-029453 filed in the Japanese Patent Office on Feb. 12, 2009, the entire content of which is incorporated herein by reference.

BACKGROUND OF THE INVENTION

1. Field of the Invention

The present invention relates to an automatic focusing control technique.

2. Description of the Related Art

A digital camera includes a technique for performing an automatic focusing (AF) operation (also referred to as "contrast AF") by using a contrast method on the basis of an image signal obtained from an image sensor. For example, in Japanese Unexamined Patent Application Publication No. 2006-227080, a technique which identifies a face (a face area) of a subject in an image capturing screen and performs the contrast AF on the basis of the image signal in a distance measuring area including the face of the subject is described.

After a predetermined operation such as a half-pressing operation of a release button is detected, in a continuous AF mode in which focus adjustment is repeatedly performed, if a predetermined operation is performed using the face of the subject as a focusing target, a tracking AF operation in which the face of the subject used as the focusing target is tracked and a state in which the face of the subject is focused is continued is performed.

On the other hand, in digital single-lens reflex cameras (DSLRs) which have spread rapidly in recent years, an AF method of a phase difference detection method (hereinafter also referred to as "phase difference AF") is employed as an AF method. In the phase difference AF, a focus position of a focus lens is calculated on the basis of light from a subject in the distance measuring area set in an angle of view, which is an image capturing area.

SUMMARY OF THE INVENTION

In such a digital single-lens reflex camera which performs the AF operation by using the phase difference detection method, when performing the tracking AF operation using the face of the subject as the focusing target in the continuous AF mode, the distance measuring area in which a focus point can be detected is limited. Therefore, whenever the face of the subject goes out of the distance measuring area, the state in which the face of the subject is focused becomes difficult to continue.

Such a problem generally occurs not only in digital single-lens reflex cameras, but also in digital cameras including the phase difference AF as an AF method.

Therefore, it is desirable to provide a technique which increases possibility to be able to continue the state in which the face of the subject is focused when the tracking AF operation is performed in an image capturing apparatus performing the AF operation by using the phase difference detection method.

A first embodiment of the present invention is an image capturing apparatus, which includes an image sensor configured to obtain a captured image of a subject image, a face detection section configured to detect a face of the subject from the captured image, a focusing control section configured to perform a tracking focusing operation for maintaining a state in which the face of the subject is focused on the basis of a phase difference detection signal obtained from a distance measuring area provided in an image capturing area, a first determination section configured to determine whether or not the face of the subject is present in the distance measuring area when the face of the subject is detected by the face detection section, and a second determination section configured to determine whether or not a body area in which a body corresponding to the face of the subject is expected to be present is present in the distance measuring area when the face of the subject is determined not to be present in the distance measuring area by the first determination section, wherein the focusing control section performs the tracking focusing operation on the basis of the phase difference detection signal obtained from the distance measuring area in which the face of the subject is determined to be present when the face of the subject is determined to be present in the distance measuring area by the first determination section, and performs the tracking focusing operation on the basis of the phase difference detection signal obtained from the distance measuring area in which the body area is determined to be present when the body area is determined to be present in the distance measuring area by the second determination section when the face of the subject is determined not to be present in the distance measuring area by the first determination section.

A second embodiment of the present invention is an image capturing apparatus, which includes an image sensor configured to obtain a captured image of a subject image, a subject detection section configured to detect a specific subject from the captured image, a focusing control section configured to perform a tracking focusing operation for maintaining a state in which the specific subject is focused on the basis of a phase difference detection signal obtained from a distance measuring area provided in an image capturing area, and a determination section configured to determine whether or not the specific subject is present in the distance measuring area when the specific subject is detected by the subject detection section, wherein the determination section determines that the specific subject is present in the distance measuring area when a state in which the specific subject is not present in the distance measuring area is not continued for a predetermined time period, and the focusing control section performs the tracking focusing operation on the basis of the phase difference detection signal obtained from the distance measuring area in which the specific subject is determined to be present when the specific subject is determined to be present in the distance measuring area by the determination section.

According to the embodiments of the present invention, in the tracking AF operation on the face of the subject, it is possible to increase the possibility to be able to continue the state in which the face of the subject is focused.

DESCRIPTION OF THE PREFERRED EMBODIMENTS

Hereinafter, embodiments of the present invention will be described with reference to the drawings.

1. First Embodiment 1-1. Configuration

Figure 1:
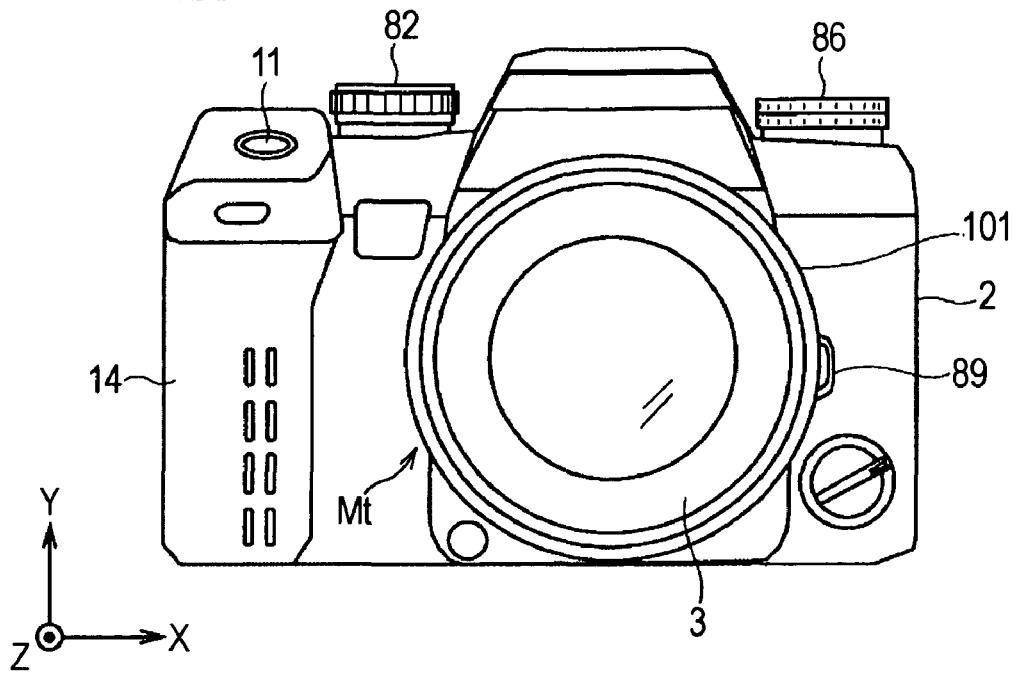
FIG. 1 is a diagram showing an external configuration of an image capturing apparatus according to a first embodiment of the present invention.
Figure 2:
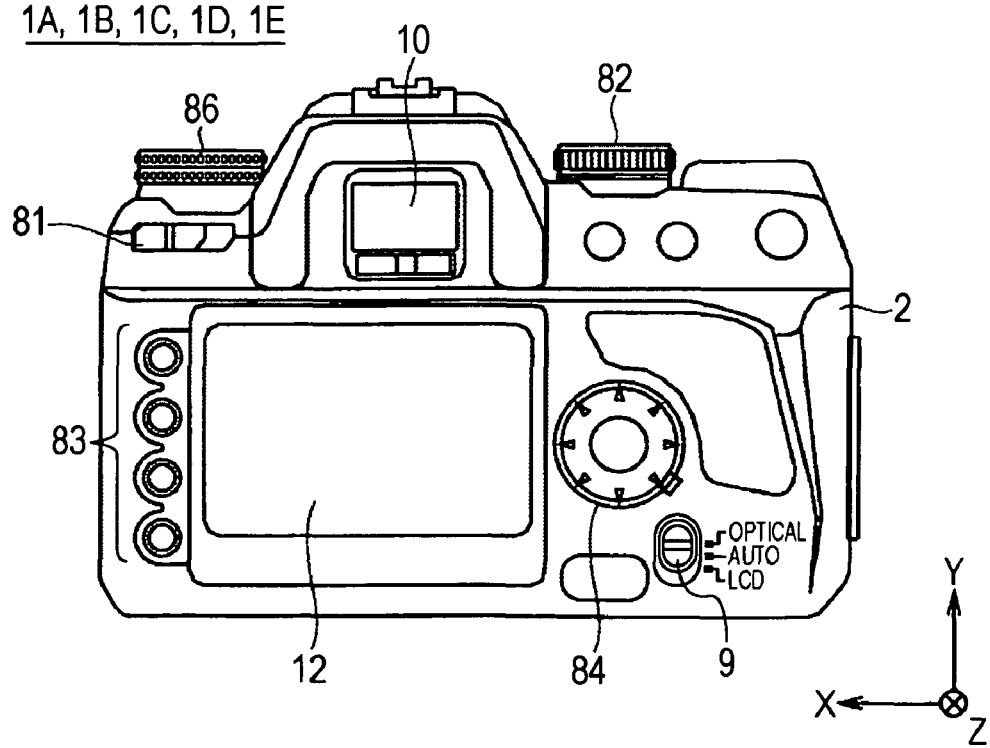
FIG. 2 is a diagram showing an external configuration of the image capturing apparatus according to the first embodiment of the present invention.

FIGS. 1 and 2 are diagrams showing an external configuration of an imaging capturing apparatus 1A according to a first embodiment of the present invention. Here, FIG. 1 is a front external view of the imaging capturing apparatus 1A and FIG. 2 is a rear external view of the imaging capturing apparatus 1A. The image capturing apparatus 1A is configured as a single-lens reflex type digital camera with interchangeable lenses.

As shown in FIG. 1, the image capturing apparatus 1A includes a camera main body (camera body) 2. An interchangeable image capturing lens unit (interchangeable lens) 3 can be attached/detached to/from the camera main body 2.

The image capturing lens 3 is constituted mainly by a lens tube 101, a lens group 37 (refer to FIG. 37) arranged in the lens tube 101, a diaphragm (not shown in the figures). The lens group 37 includes a focus lens or the like for changing a focus position by being moved in an optical axis direction.

The camera main body 2 includes a mount section Mt having a ring shape in which the image capturing lens 3 is mounted approximately in the front center and an attach/detach button 89 for attaching/detaching the image capturing lens 3 near the mount section Mt having a ring shape.

The camera main body 2 also includes a mode setting dial 82 in the front upper left portion thereof and a control value setting dial 86 in the front upper right portion thereof. By operating the mode setting dial 82, it is possible to perform setting operations (switching operations) of various camera modes (including various image capturing modes (a portrait mode, a landscape mode, a continuous image capturing mode, and the like), a reproduction mode for reproducing a captured image, and a communication mode for communicating with an external device). By operating the control value setting dial 86, it is possible to set control values for various image capturing modes.

The camera main body 2 also includes a grip section for a photographer to grasp the camera in the front left edge portion. A release button for instructing start of exposure is arranged on an upper surface of the grip section 14. A battery storage room and a card storage room are provided inside the grip section 14. For example, four AA dry cell batteries are stored in the battery storage room as a power supply for the camera, and a memory card 90 (refer to FIG. 5) for recording image data of the captured image is attachably/detachably stored in the card storage room.

The release button 11 is a two-state detection button capable of detecting two states, a half-pressed state (S1 state) and a fully-pressed state (S2 state). When the release button 11 is pressed halfway so as to be in the S1 state, preparation operations (for example, an AF control operation, an AE control operation, and the like) for obtaining a still image (the image to be captured) of a subject to be recorded are performed. When the release button is further pressed so as to be in the S2 state, image capturing operations of the image to be captured are performed (a series of operations are performed in which an exposure operation related to the subject image is performed using an image sensor (also referred to as "main image sensor") 5 (described below), and predetermined image processing is performed on an image signal obtained by the exposure operation).

In FIG. 2, a monitor 12 is provided in approximately the center of the rear surface of the camera main body 2. The monitor 12 is configured as, for example, a color liquid crystal display (LCD). The monitor 12 can display a menu screen for setting image capturing conditions and the like, and can reproduce and display a captured image recorded in the memory card 90 in the reproduction mode.

A finder window 10 is provided in approximately the upper center of the rear surface of the camera main body 2. A subject image from the image capturing lens unit 3 is introduced in the finder window 10, and a photographer can visually check an image equivalent to the subject image obtained by the main image sensor 5 by looking into the finder window 10. Specifically, the subject image incident in an image capturing optical system is reflected upward by a mirror mechanism 6 (refer to FIG. 3) and visually checked via an eye lens 67. In this way, the photographer can determine a composition by looking into the finder window 10. When the S2 state of the release button 11 is detected and the image capturing operation of the image to be captured is started, the mirror mechanism 6 evacuates from an optical path of light forming the subject image, the light (the light forming the subject image) from the image capturing lens unit 3 reaches the main image sensor 5, and the captured image (image data) of the subject is obtained.

A main switch 81 is provided in the upper left of the monitor 12. The main switch 81 is constituted by a two-position slide switch. When a contact point is set in an "OFF" position, the power of the imaging apparatus 1A is turned off, and when the contact point is set in an "ON" position, the power of the imaging apparatus 1A is turned on.

A direction selection key 84 and a display switching switch 9 are provided to the right of the monitor 12. The direction selection key 84 has a circular shaped button, and detects four-direction press operations of up, down, left, and right directions, and four-direction press operations of upper right, upper left, lower right, and lower left directions respectively. In the direction selection key 84, besides the above eight-direction press operations, a press operation of a push button at the center of the key is detected.

The direction selection key 84 is used, for example, to perform a menu operation on the menu screen, and for example, the AF mode of the image capturing apparatus 1A can be set by the menu operation. Specifically, in the image capturing apparatus 1A, either one of one-shot AF mode and continuous AF mode can be set as the AF mode by the menu operation.

In the One-Stop AF mode, responding to a detection of the half-pressed state of the release button 11, the AF operation of the phase difference detection method is performed. When the image capturing lens is moved to a lens focus position by the AF operation, the lens position of the image capturing lens is fixed.

In the continuous AF mode, responding to the detection of the half-pressed state of the release button 11, the AF operation of the phase difference detection method is started, and the AF operation is repeatedly performed until the fully-pressed state of the release button 11 is detected. In this way, even after the subject to be focused is focused once, the state in which the subject is focused can be maintained.

The display switching switch 9 is constituted by a three-position slide switch. When a contact point of the display switching switch 9 is set on an upper "Optical" position, OVF mode is selected and the subject image is displayed in an optical finder's field of view. In this way, the photographer can visually check the display in the optical finder's field of view through the finder window 10, and perform a composition determination operation (also referred to as "framing").

When the contact point of the display switching switch 9 is set on a lower "Liquid Crystal" position, EVF mode (described below) is selected and a live view image of the subject image is displayed on the monitor 12 in moving picture form. In this way, the photographer can perform the framing by visually checking the live view image displayed on the monitor 12.

When the contact point of the display switching switch 9 is set on a middle "Auto" position, the display in the optical finder's field of view and the live view image are automatically switched to each other depending on whether or not the photographer looks into the finder window 10. In this way, the photographer can perform the framing by visually checking either one of the display in the optical finder's field of view and the live view image.

A setting button group 83 constituted by a plurality of buttons for performing setting of the menu screen, deletion of the image, and the like is provided on the left side of the monitor 12.

Figure 3:
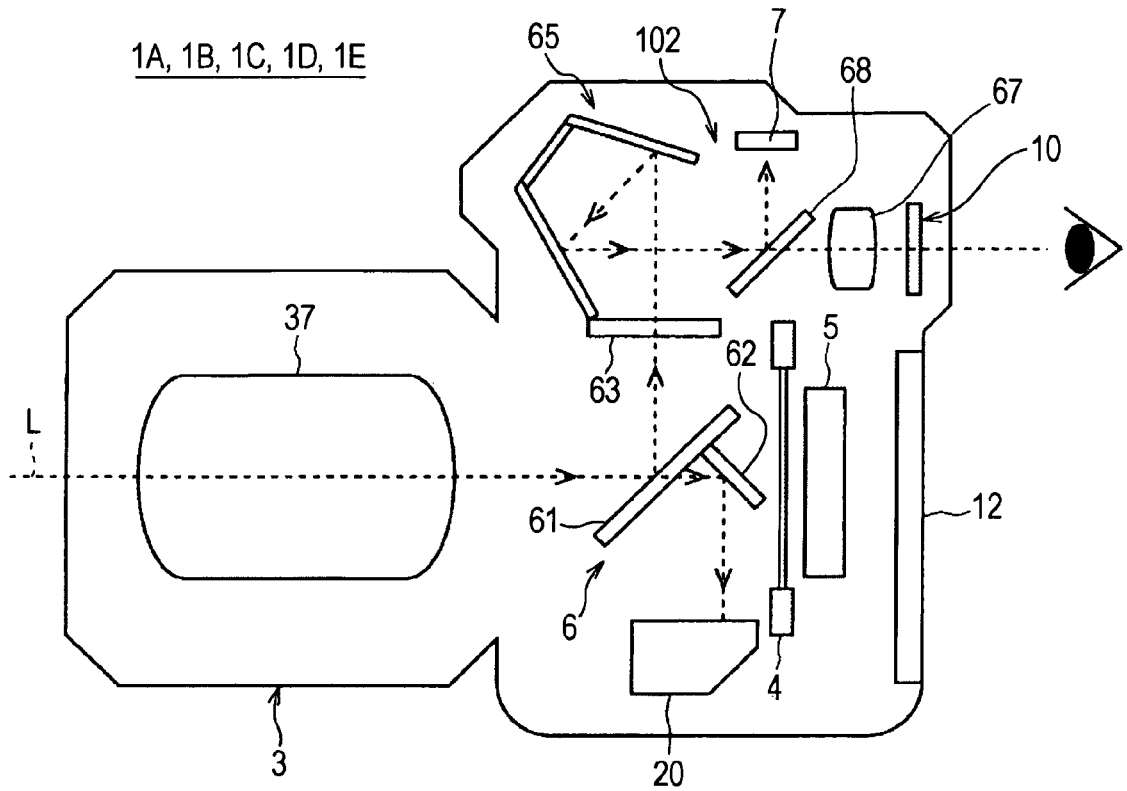
FIG. 3 is a vertical sectional view of the image capturing apparatus according to the first embodiment.
Figure 4:
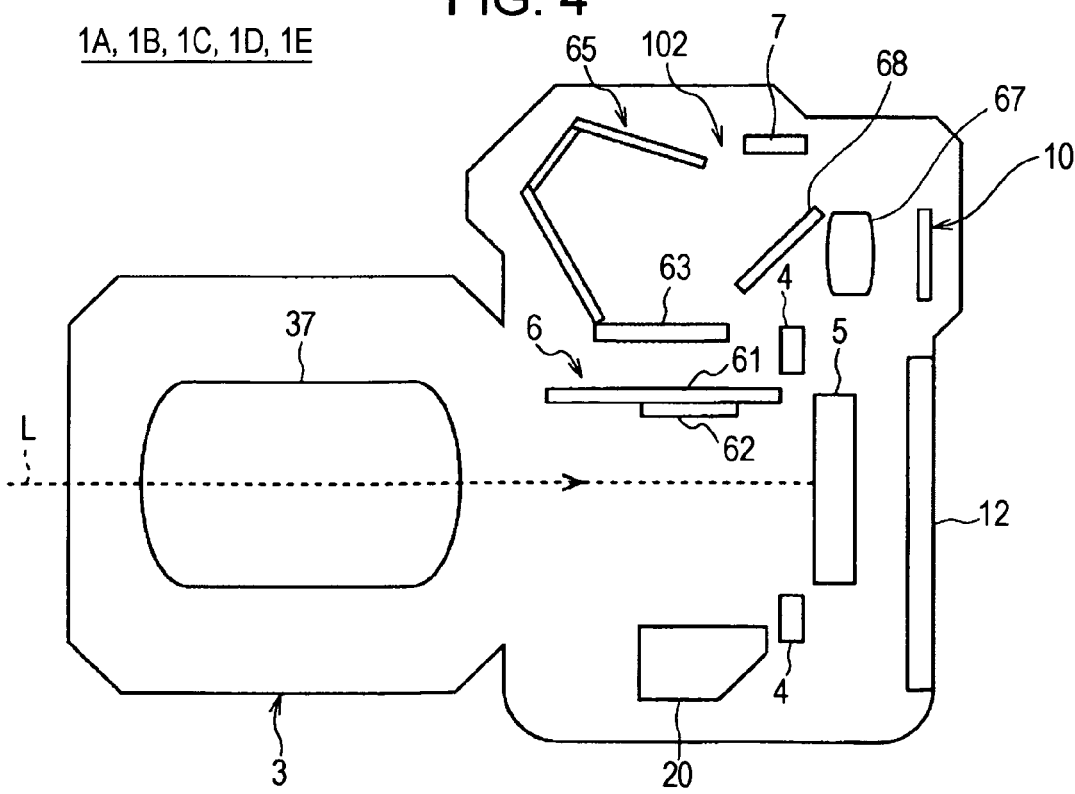
FIG. 4 is a vertical sectional view of the image capturing apparatus according to the first embodiment.

Next, an internal configuration of the image capturing apparatus 1A will be described. FIGS. 3 and 4 are vertical sectional views of the image capturing apparatus 1A according to the first embodiment.

As shown in FIG. 3, the image capturing apparatus 1A includes, inside thereof, a finder section 102 (finder optical system), the mirror mechanism 6, a phase difference AF module (hereinafter simply referred to as "AF module") 20, a shutter 4, the main image sensor 5, a sub-image sensor 7, and the like.

The main image sensor (here, CCD sensor (also simply referred to as "CCD")) 5 is arranged in a plane perpendicular to an optical axis L on the optical axis L of the lens group 37 included in the image capturing lens unit 3. The main image sensor 5 converts the subject image received optically in the image capturing plane into an electrical signal by photoelectric conversion, and generates an image signal of the captured image.

The shutter 4 is arranged just in front of the main image sensor 5. The shutter 4 is a mechanical focal plane shutter, which includes a curtain body moving in the vertical direction, and performs an optical path opening operation and an optical path blocking operation of the subject light guided to the main image sensor 5 along the optical path L.

On the optical path L described above, in a position in which the subject light is reflected to the finder section 102, the mirror mechanism 6 (reflecting plate) is arranged. The subject light having passed through the image capturing lens unit 3 is reflected upward by the mirror mechanism 6 (main mirror 61 described below), and forms an image on a focusing plate 63 (focusing glass).

The finder section 102 includes a pentamirror 65, a half mirror 68, the eye lens 67, the sub-image sensor 7, and the finder window 10. The pentamirror 65 replaces, in the subject image, upper image with lower image, and left image with right image by reflection, and forms an erected image. The half mirror 68 is arranged between the pentamirror 65 and the eye lens 67, and divides (branches) the subject light. Each of the divided subject lights is guided to the eye lens 67 and the sub-image sensor 7 respectively. The eye lens 67 guides the divided subject light to the outside of the finder window 10. In this way, the photographer can visually check the subject image via the finder window 10. As described above, the finder section 102 functions as an optical finder (OVF) for checking the subject image in an image capturing standby state.

The sub-image sensor 7 optically receives the other divided subject light, and sequentially obtains the captured images of the subject image. The obtained captured images are sequentially displayed on the monitor 12 in moving picture form (live view display). As described above, the subject image which can be visually checked from the finder window 10 is obtained by the sub-image sensor 7, and the photographer can visually check the live view image of the subject image on the monitor 12.

The mirror mechanism 6 is constituted by a main mirror 61 and a sub-mirror 62, and the sub-mirror is rotatably provided so that the sub-mirror tilts to the rear surface of the main mirror 61. The main monitor 61 is configured as, for example, a half mirror, and a part of the subject light passes through the main mirror 61. The part of the subject light having passed through the main mirror 61 is reflected by the sub-mirror 62, and enters the AF module 20.

The mirror mechanism 6 described above is configured as a so-called quick return mirror, and at an exposure time when the S2 state of the release button 11 is detected, the mirror mechanism 6 pops up, and stops in a position under the focusing plate 63 (refer to FIG. 4). In this way, the subject light from the image capturing lens unit 3 reaches the main image sensor 5 without being blocked by the mirror mechanism 6, and the main image sensor 5 is exposed to the subject light. When the exposure is completed, the mirror mechanism 6 returns to the original position (position shown in FIG. 3).

The AF module 20 is configured as a so-called AF sensor constituted by a distance measuring element which detects focus information of the subject, or the like. Specifically, the AF module has a phase difference detection function for optically receiving the light from the subject (specifically, the light entered via the mirror mechanism 6) in the distance measuring area (also referred to as "focus area" or "AF area")

set in the image capturing area, and outputting the phase difference detection signal corresponding to the degree of focusing of the subject image.

1-2. Function Block

Figure 5:
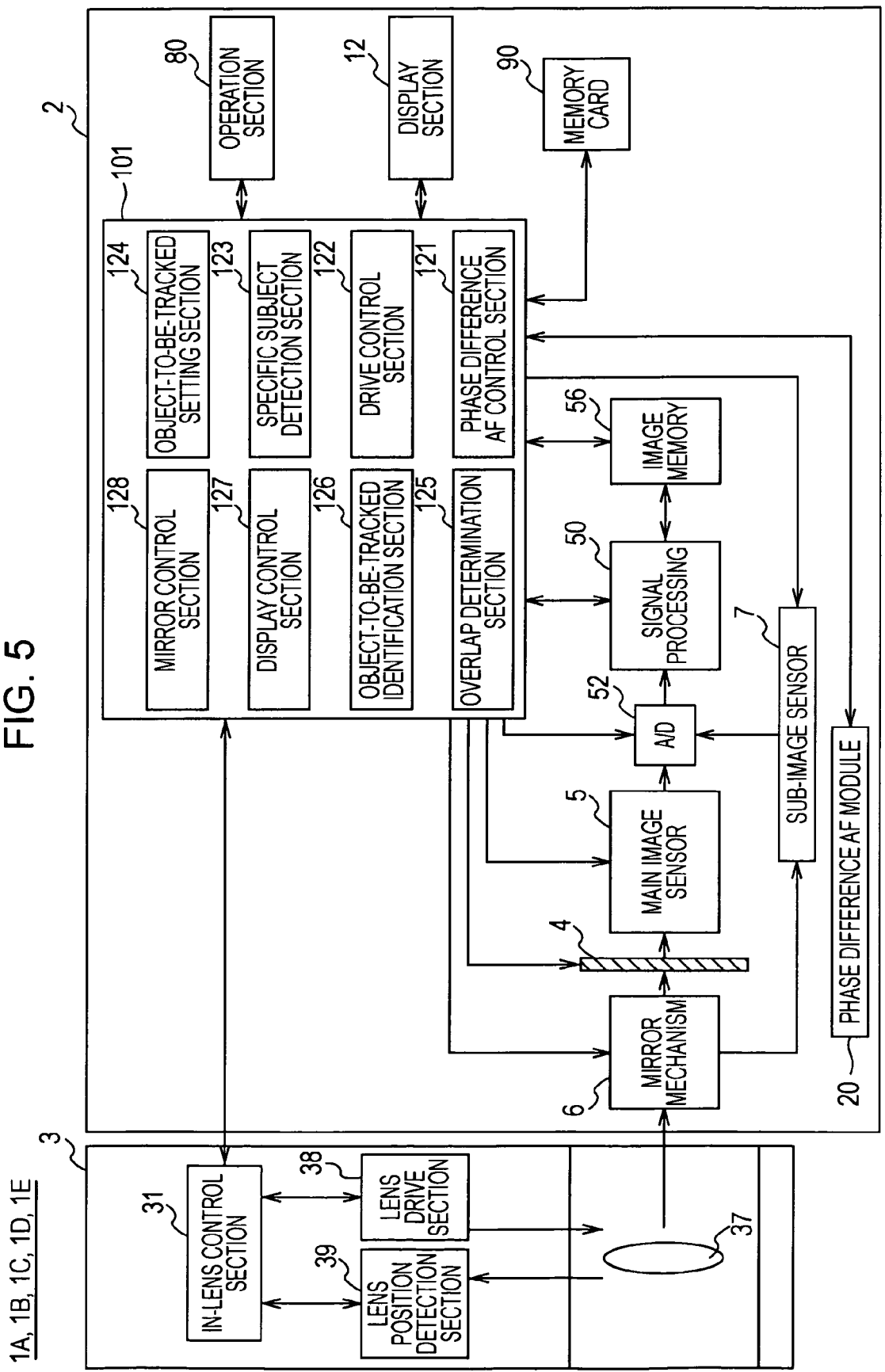
FIG. 5 is a block diagram showing a functional configuration of the image capturing apparatus according to the first embodiment.
Figure 6:
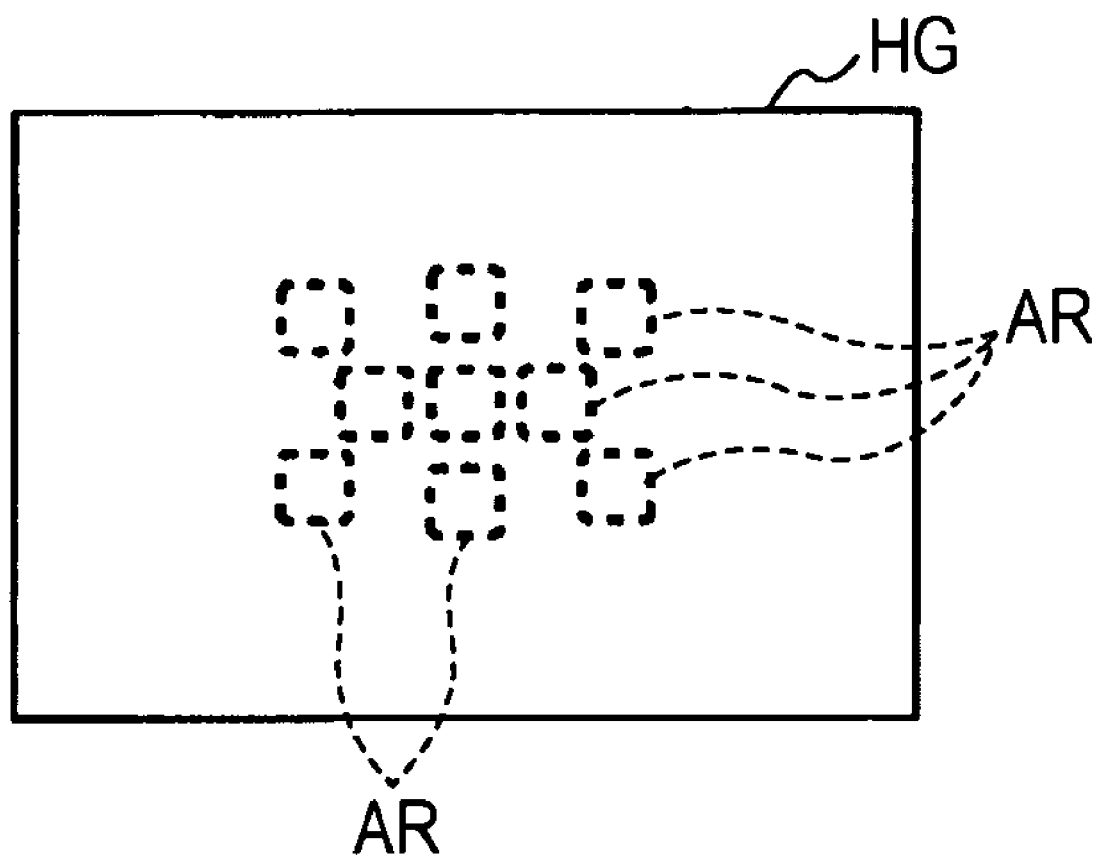
FIG. 6 is a diagram showing a distance measuring area displayed in an auxiliary image.

Next, an outline of functions of the image capturing apparatus 1A will be described. FIG. 5 is a block diagram showing a functional configuration of the image capturing apparatus 1A according to the first embodiment. FIG. 6 is a diagram showing the distance measuring area displayed in an auxiliary image HG.

As shown in FIG. 5, the imaging apparatus 1A includes the phase difference AF module 20, an operation section 80, an entire control section 101, the mirror mechanism 6, the shutter 4, the shutter 4, the main image sensor 5, an A/D conversion circuit 52, a digital signal processing circuit 50, an image memory 56, and the like.

The operation section 80 is configured to include various buttons, switches, and the like including the release button 11 (refer to FIG. 1). Responding to an input operation to the operation section 80 by the user, the entire control section 101 realizes various operations.

Responding to a drive control signal (accumulation start signal and accumulation end signal) inputted from a timing control circuit (not shown in the figures), the main image sensor 5 performs exposure (charge accumulation by photoelectric conversion) of the subject image formed on a light receiving surface (image capturing surface), and generates an image signal of the subject image.

The sub-image sensor 7 basically has the same function as that of the main image sensor 5, performs exposure of the subject image guided to the finder optical system, and obtains an image signal of an image for the live view display.

The image signal (analog signal) obtained by the main image sensor 5 is converted into a digital signal by the A/D conversion circuit 52. The image signal converted into the digital signal is inputted to the digital signal processing circuit 50.

The digital signal processing circuit 50 performs digital signal processing on the image signal inputted from the A/D conversion circuit 52. Specifically, the digital signal processing circuit 50 performs digital signal processing such as black level correction processing, white balance (WB) processing, and γ correction processing. The image signal (image data) after the signal processing is stored in the image memory 56.

The image memory 56 is a high-speed accessible memory for temporarily storing the generated image data, and has a capacity to be able to store image data of a plurality of flames.

When the image capturing is performed, image processing (compression processing or the like) is appropriately performed on the image data temporarily stored in the image memory 56 by the entire control section 101, and then the image data is stored in the memory card 90.

Predetermined processing is performed on the image data obtained by the sub-image sensor 7 by the AD conversion circuit 52 and the digital signal processing circuit 50, and the image data is once stored in the image memory 56. Thereafter the image data is displayed on the monitor 12.

The entire control section 101 is configured as a microcomputer, and mainly includes a CPU, a memory, a ROM, and the like. The entire control section 101 reads a program stored in the ROM, and realizes various functions by causing the CPU to execute the program.

By executing the program, the entire control section 101 functionally realizes a phase difference AF control section 121, a drive control section 122, a specific subject detection section 123, an object-to-be-tracked setting section 124, an overlap determination section 125, an object-to-be-tracked identification section 126, a display control section 127, a mirror control section 128, and the like.

The phase difference AF control section 121 performs an automatic (AF) focusing operation (phase difference AF operation) by the phase difference method. Specifically, the phase difference AF control section 121 performs a lens focus position specification operation for specifying the position (lens focus position) of the image capturing lens (more specifically, focus lens) when the focus is adjusted on the basis of the phase difference detection signal outputted from the AF module 20.

The phase difference AF control section 121 also performs a lens driving operation for moving the image capturing lens (focus lens) to a focused position of the lens in cooperation with the drive control section 122. Specifically, the phase difference AF control section 121 transmits a control signal to an in-lens control section 31 of the image capturing lens 3 via the drive control section 122 to drive the lens drive section 38, and moves the focus lens included in the lens group 37 of the image capturing lens 3 in the optical axis direction thereof. The position of the focus lens is detected by a lens position detection section 39 of the image capturing lens 3, and data indicating the position of the focus lens is transmitted from the in-lens control section 31 to the entire control section 101 in the main body.

The specific subject detection section 123 detects a specific subject from the captured image (also referred to as "auxiliary image") obtained by the sub-image sensor 7. Here, a face of a person (also referred to as "face of the subject" or simply referred to as "face area") is used as a target to be focused, and the face area is detected from the auxiliary image as the specific subject. As a detection method of the face area, for example, a method may be employed in which a skin color portion of the image is extracted on the basis of pixel values of each pixel in the captured image, and the skin color portion is detected as a face of a person when the area of the skin color portion is greater than a predetermined threshold value. Or, a method may be employed in which a face of a person is detected by extracting a specific portion of a face such an eye, a mouth, and the like by using an existing pattern recognition technique. The detection of the face area by the specific subject detection section 123 is performed when a face detection function is enabled by the menu operation on the menu screen in the EVF mode.

The object-to-be-tracked setting section 124 has a function for setting an object to be tracked (also referred to as "object to be tracked") from the specific object (here, the face) detected in the captured image by the specific subject detection section 123.

For example, when tracking the face of the person detected by the specific subject detection section 123, a face to be tracked, which is a target to be tracked, is determined from the detected faces in cooperation with the overlap determination section 125 described below. The determination of the face to be tracked is performed on the basis of whether or not the detected face is present in the distance measuring area, and a face present in an area overlapping the distance measuring area is set as the face to be tracked. When there are a plurality of faces overlapping the distance measuring area, the face to be tracked is determined by reference to the reliability as a face when detected by the specific subject detection section 123, the size of the detected face, the position of the detected face in the captured image, the distance from the image capturing apparatus 1 to the detected face, and the like. For example, when the size of the detected face is large, the detected face may be preferentially set as the face to be tracked assuming that the detected face is a main subject intended by the user, or a face present in the center of the captured image may be preferentially set as the face to be tracked.

When the object-to-be-tracked setting section 124 loses the sight of the face to be tracked which has been once set, the object-to-be-tracked setting section 124 re-sets (changes) the face to be tracked.

Such setting and re-setting of the face to be tracked is performed when the face detection function is enabled in the continuous AF mode. When the face to be tracked is set, the AF operation (also referred to as "tracking AF operation" or "tracking focusing operation") is performed in which a state that the face to be tracked is focused is realized (maintained).

The overlap determination section 125 has a function for determining whether or not the specific object detected by the specific subject detection section 123 is present in the distance measuring area.

The overlap determination whether or not the specific subject is present in the distance measuring area is performed by comparing a distance measuring area (also referred to as "corresponding distance measuring area" or "conversion distance measuring area") AR of when a distance measuring area set in advance in the AF module 20 is represented on the auxiliary image HG and the detected specific subject. Specifically, in the overlap determination section 125, coordinate values of each pixel included in the corresponding distance measuring area AR on the auxiliary image and coordinate values of each pixel constituting the face area on the auxiliary area are compared, and a degree of the overlap between the face area and the corresponding distance measuring area AR is identified. Whether or not the face area is present in the distance measuring area is determined in accordance with the degree of the overlap between the face area and the distance measuring area. For example, when at least a part of the pixels of the face area is present on the corresponding distance measuring area AR, it is determined that the face area as the specific subject is present in the distance measuring area.

The overlap determination section 125 also has a function for determining whether or not an area in which a body corresponding to the face area is expected (estimated) to be present (also referred to as "expected body area" or simply referred to as "body area") is present in the distance measuring area when the face area is determined not to be present in the distance measuring area.

The object-to-be-tracked identification section 126 has a function for identifying the object to be tracked in each auxiliary image obtained sequentially by the sub-image sensor 7. The identification of the tacked object is performed by using an obtained auxiliary image (also referred to as "new auxiliary image") and an auxiliary image obtained just before the new auxiliary image (also referred to as "old auxiliary image"). As a method for identifying the object to be tracked, for example, a method is employed in which a specific subject, the position of which is closest to the object to be tracked in the old auxiliary image, in specific subjects detected in the new auxiliary image is identified as the object to be tracked in the new auxiliary image. Or, a method may be employed in which, in the specific subjects detected in the new auxiliary image, a specific subject having a reliability closest to that of the specific subject identified as the object to be tracked in the old auxiliary image is identified as the object to be tracked in the new auxiliary image.

The display control section 127 controls display contents on a display section such as the monitor 12.

The mirror control section 128 controls state switching between a state in which the mirror mechanism 6 evacuates from the optical path (mirror up state) and a state in which the mirror mechanism 6 blocks the optical path (mirror down state). The mirror control section 128 switches between the mirror up state and the mirror down state by drive-controlling a mirror switch motor (not shown in the figures).

1-3. Tracking AF Operation

Figure 7:
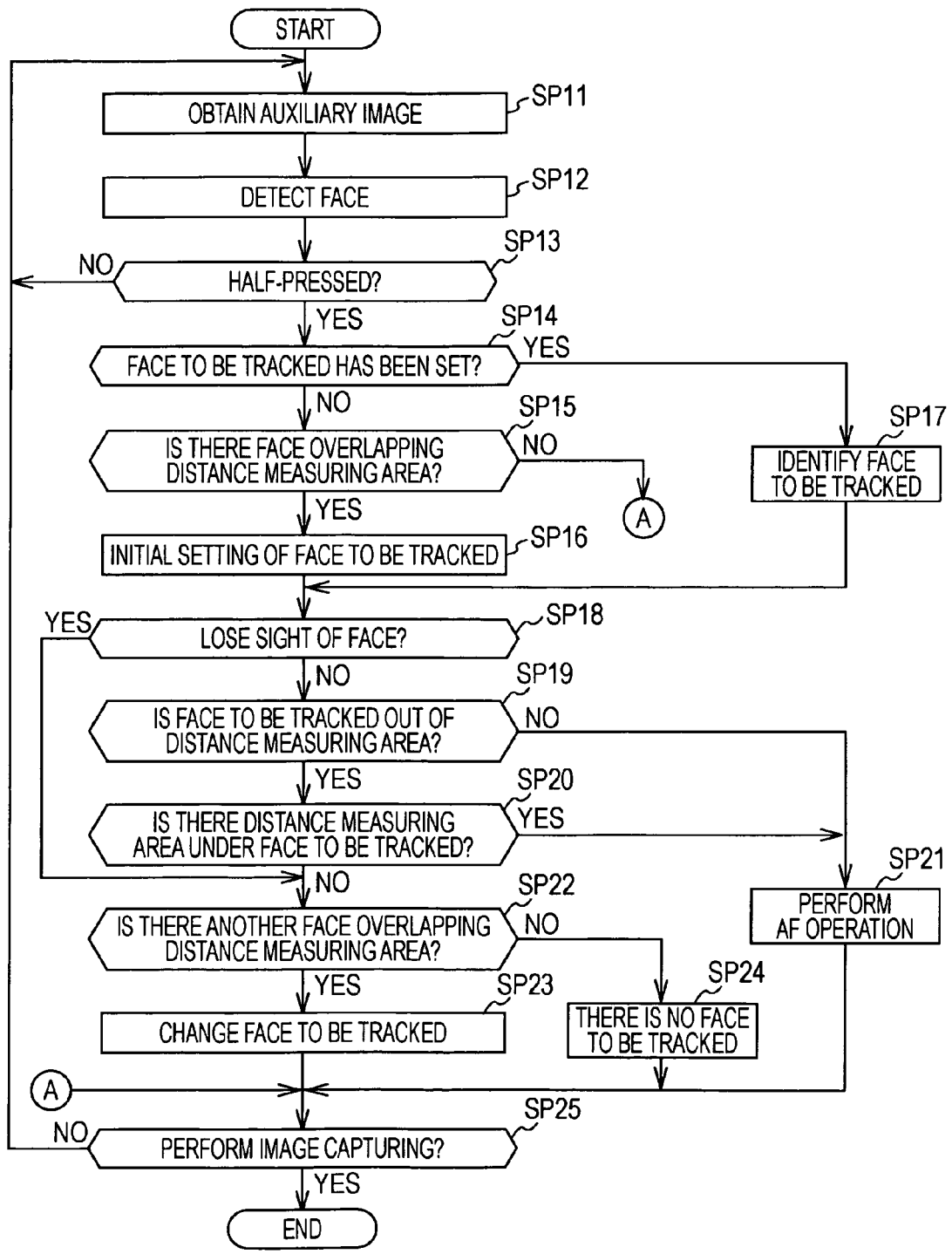
FIG. 7 is a flowchart showing a tracking AF operation of the image capturing apparatus according to the first embodiment.
Figure 8:
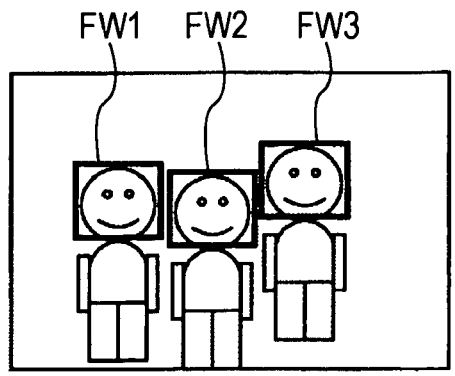
FIG. 8 is a diagram showing a form of a live view display.
Figure 9:
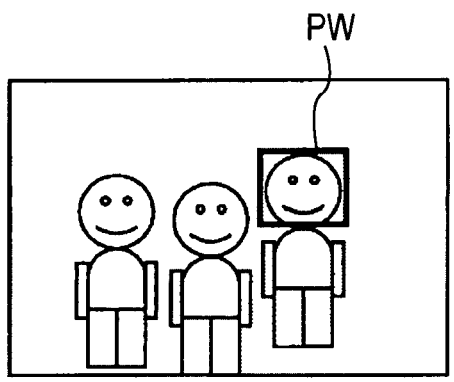
FIG. 9 is a diagram showing a form of the live view display.
Figure 10:
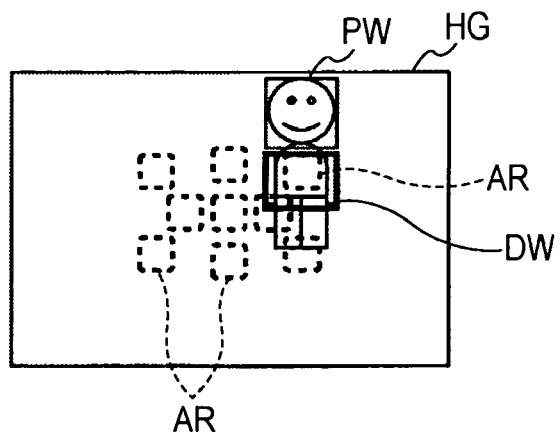
FIG. 10 is a virtual diagram in which a rectangular frame is set under a face area.
Figure 11:
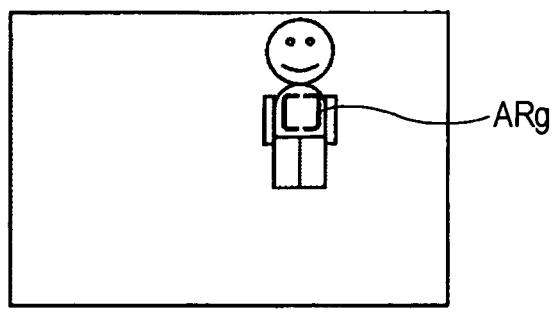
FIG. 11 is a diagram showing a form of the live view display.

Next, the tracking AF operation performed when the face detection function is enabled in the continuous AF mode will be described in detail. FIG. 7 is a flowchart showing the tracking AF operation of the image capturing apparatus 1A. FIGS. 8, 9, and 11 are diagrams showing a form of the live view display. FIG. 10 is a virtual diagram in which a rectangular frame DW is set under the face area.

When the continuous AF mode is selected in a state in which the face detection function is enabled in the EVF mode, a setting operation of the face to be tracked is started.

Specifically, as shown in FIG. 7, first, in step SP11, the auxiliary image is obtained by the sub-image sensor 7.

In step SP12, in the specific subject detection section 123, a face of a person (face area) is detected from the auxiliary image as the specific subject. When the face area is detected, as shown in FIG. 8, face frames FW1 to FW3 surrounding the face areas are superimposed on the auxiliary image (live view image) and displayed by the display control section 127.

In FIG. 8, an example in which the subject is a plurality of persons (three persons) is illustrated, and three face frames FW1 to FW3 surrounding each subject person are displayed.

In step SP13, whether or not the half-pressed state of the release button 11 is detected is determined. When the half-pressed state of the release button 11 is not detected, the operation process moves to step SP11, and each processing from step SP11 to step SP13 is repeatedly performed until the half-pressed state of the release button 11 is detected. When the half-pressed state of the release button 11 is detected, the operation process moves to step SP14.

In step SP14, whether the face to be tracked has been already set or not is determined. When it is determined that the face to be tracked has not been set, in other word, when an initial setting of the face to be tracked is performed, the operation process moves to step SP15.

In step SP15, whether or not a face overlapping the distance measuring area is present in the faces detected from the auxiliary image is determined by the overlap determination section 125. When a face overlapping the distance measuring area is present, the operation process moves to step SP16, and when a face overlapping the distance measuring area is not present, the process moves to step SP25 described below.

In step SP16, the face to be tracked is determined from the faces overlapping the distance measuring area by the object-to-be-tracked setting section 124. When there is one face overlapping the distance measuring area, the face is set as the face to be tracked. When there are a plurality of faces overlapping the distance measuring area, one face out of the plurality of faces overlapping the distance measuring area is set as the face to be tracked on the basis of the reliability as a face, the size of the face, and/or the like. When the face to be tracked is set, as shown in FIG. 9, a face frame PW surrounding the face to be tracked is superimposed on the auxiliary image and displayed while all of the other face frames FW1 and FW2 other than the face frame of the face to be tracked are deleted.

The frame display color of the face frame PW surrounding the face to be tracked may be differentiated from that of the face frames FW1 to FW3 surrounding the face areas in FIG. 8, and for example, when the face frames FW1 to FW3 surrounding the face areas are displayed in white, the face frame PW surrounding the face to be tracked may be displayed in orange. When the AF operation process (step SP21)

described below is performed, and the face to be tracked is focused, the display color of the face frame PW surrounding the face to be tracked may be changed from orange to green. In this way, the user can know whether the subject is focused or not by recognizing the display color of the face frame.

On the other hand, in step SP14, when it is determined that the face to be tracked is set, in other word, when the face to be tracked has already been set, the operation process moves to step SP17.

In step SP17, the face to be tracked is identified from the auxiliary image by the object-to-be-tracked identification section 125. Step SP17 is a process performed every time the auxiliary image is obtained and the face detection is performed after the initial setting of the face to be tracked, and by performing step SP17, the face to be tracked is identified in each auxiliary image when the face detections are performed in time series.

In next step SP18, whether or not the sight of the face to be tracked is lost is determined. When the face to be tracked is initially set in step SP16, and when the face to be tracked is identified in step SP17, the sight of the face to be tracked is determined not to be lost in step SP18, and the operation process moves to step SP19.

In step SP19, whether or not the face to be tracked is out of the distance measuring area is determined by the overlap determination section 125. The determination whether the face to be tracked is out of the distance measuring area is performed on the basis of the determination whether the face area identified as the face to be tracked is present in the distance measuring area. Specifically, when the face area as the face to be tracked is not present in the distance measuring area, the face to be tracked is determined to be out of the distance measuring area, and when the face area as the face to be tracked is present in the distance measuring area, the face to be tracked is determined not to be out of the distance measuring area.

When the face to be tracked is not determined to be out of the distance measuring area in step SP19, in other word, when the face to be tracked is determined to be present in the distance measuring area, the operation process moves to step SP21. In step SP21, the AF operation is performed in which the face to be tracked is focused, specifically, the AF operation is performed which uses the phase difference detection signal obtained in the distance measuring area where the subject light from the face to be tracked is optically received.

When the face to be tracked is determined to be out of the distance measuring area in step SP19, in other word, when the face to be tracked is determined not to be present in the distance measuring area, the operation process moves to step SP20.

In step SP20, whether or not the distance measuring area is present under the face to be tracked is determined.

Since the body part corresponding to the face to be tracked is considered to be present under the face to be tracked, when the AF operation is performed on the basis of the subject light from the area under the face to be tracked and the area under the face to be tracked is focused, the possibility that the face to be tracked is focused becomes high.

Therefore, in step SP20, by determining whether or not an area in which the body is expected to be present (expected body area) is present in the distance measuring area, it is determined whether or not the state in which the face to be tracked is focused can be maintained. Specifically, as shown in FIG. 10, on the auxiliary image HG, a rectangular frame (also referred to as "body frame") DW having approximately the same size as that of the face frame PW showing the face to be tracked is set under the face to be tracked, and whether or not the rectangular frame overlaps the corresponding distance measuring area AR is determined by the overlap determination section 125. The overlap determination between the rectangular frame DW and the corresponding distance measuring area AR is performed in the same way as the overlap determination between the face area and the corresponding distance measuring area AR, and is performed on the basis of whether or not pixels included in the rectangular frame DW are included in the corresponding distance measuring area AR in the auxiliary image. When setting the rectangular frame DW, a tilt of the face is detected on the basis of a relative positional relationship between eyes, mouth, and the like in the detected face, and the downward direction of the face is identified.

When the distance measuring area is determined to be present under the face to be tracked in step SP20, the operation process moves to step SP21 without changing the face to be tracked. When the operation process moves to step SP21 via step SP20, in step SP21, the AF operation is performed by using the phase difference detection signal obtained in the distance measuring area where the subject light from the body is optically received. When a state in which the expected body area is focused is realized by the AF operation, the face frame PW surrounding the face to be tracked is deleted, and the distance measuring area used by the AF operation is displayed (refer to FIG. 11). In this way, the user can know the area to be focused in the image capturing area.

On the other hand, when the distance measuring area is determined not to be present under the face to be tracked in step SP20, the operation process moves to step SP22.

In step SP22, since it is difficult to perform the AF operation on the face area which is currently set as the face to be tracked, whether or not the face to be tracked can be changed is determined. Specifically, whether or not a face area overlapping the distance measuring area is present in the other face areas other than the face area currently set as the face to be tracked.

When another face area overlapping the distance measuring area is determined to be present in step SP22, the operation process moves to step SP23. In step SP23, the face to be tracked is changed by the face-to-be-tracked setting section 124, and the face area overlapping the distance measuring area is set as new face to be tracked.

When another face area overlapping the distance measuring area is determined not to be present in step SP22, the operation process moves to step SP24. In step SP24, the setting of the face to be tracked is canceled by the face-to-be-tracked setting section 124 because there is not the face to be tracked.

In step SP25, whether or not to start the image capturing operation is determined on the basis of whether or not the fully-pressed state of the release button 11 is detected.

When the fully-pressed state of the release button 11 is not detected, the operation process moves to step SP11, and each processing from step SP11 to step SP24 is repeatedly performed until the fully-pressed state of the release button 11 is detected. In this way, from when the half-pressed state of the release button 11 is detected until when the fully-pressed state of the release button 11 is detected, focus adjustment on the face to be focused is repeatedly performed, so that the state that the face to be tracked is focused can be maintained. When the fully-pressed state of the release button 11 is detected, the tracking AF operation is ended, and the image capturing operation is started.

1-4. Display Form of Face Frame

Figures 12, 13:
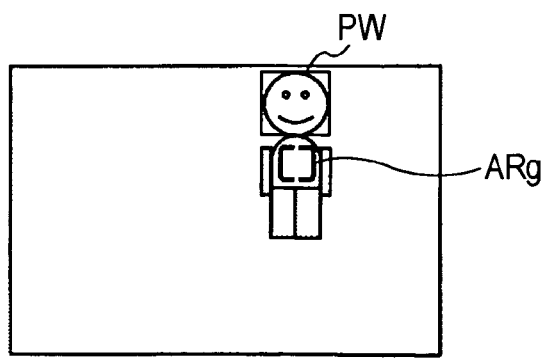
FIG. 12 is a diagram for explaining a display form of the face area in accordance with an operation state.
FIG. 13 is a diagram showing a form of the live view display.

In the image capturing apparatus 1A, display form of the face frame displayed by being integrated into (superimposed on) the live view image is changed by the display control section 127 in accordance with the operation state of the tracking AF operation. FIG. 12 is a diagram for explaining the display form of the face area in accordance with the operation state. FIG. 13 is a diagram showing a form of the live view display.

As shown in FIG. 12, in state D1 in which faces are detected from the auxiliary image before the release button is half-pressed, the face frame FW surrounding the face is displayed for each face detected from the auxiliary image (refer to FIG. 8).

In state D2 in which the face to be tracked is set from the faces detected from the auxiliary image, the face frame PW surrounding the face to be tracked is displayed (refer to FIG. 9). The display color of the face frame PW surrounding the face to be tracked is changed to differentiate from the face frame FW displayed in the state D1. For example, when the display color of the face frame FW displayed in the state D1 is white, the face frame PW surrounding the face to be tracked may be displayed in orange.

In state D3 in which the AF operation is performed on the face to be tracked and the face to be tracked is focused, the display of the face frame PW surrounding the face to be tracked is continued, and the display color of the face frame PW surrounding the face to be tracked is changed. For example, if the display color of the face frame PW is orange before the face is focused, the face frame PW may be displayed in green after the face is focused. In this way, the user can know whether or not the face to be tracked is focused.

In state D4 in which the AF operation is performed on an area where the body corresponding to the face to be tracked is expected to be present and the area is focused, the face frame PW surrounding the face to be tracked is deleted and the distance measuring area ARg (the distance measuring area overlapping the expected body area) is highlighted (refer to FIG. 11). Or, in the state D4, the distance measuring area ARg used for the AF operation may be highlighted while the face frame PW surrounding the face to be tracked is displayed (refer to FIG. 13).

When the face to be tracked is difficult to be focused because the sight of the face to be tracked is lost when the tracking AF operation is performed, or when the face to be tracked is difficult to be focused because the distance measuring area overlapping the face to be tracked is not present, the face frame PW surrounding the face to be tracked is deleted.

When the face of the subject is determined not to be present in the distance measuring area, the image capturing apparatus 1A according to the embodiment determines whether or not the body area in which the body corresponding to the face of the subject is expected to be present is present in the distance measuring area, and when the body area is determined to be present in the distance measuring area, the image capturing apparatus 1A performs the tracking AF operation on the basis of the phase difference detection signal obtained from the distance measuring area in which the body area is determined to be present. In this way, in the tracking AF operation on the face of the subject, it is possible to increase the possibility to be able to continue the state in which the face of the subject is focused.

2. Second Embodiment

Figure 14:
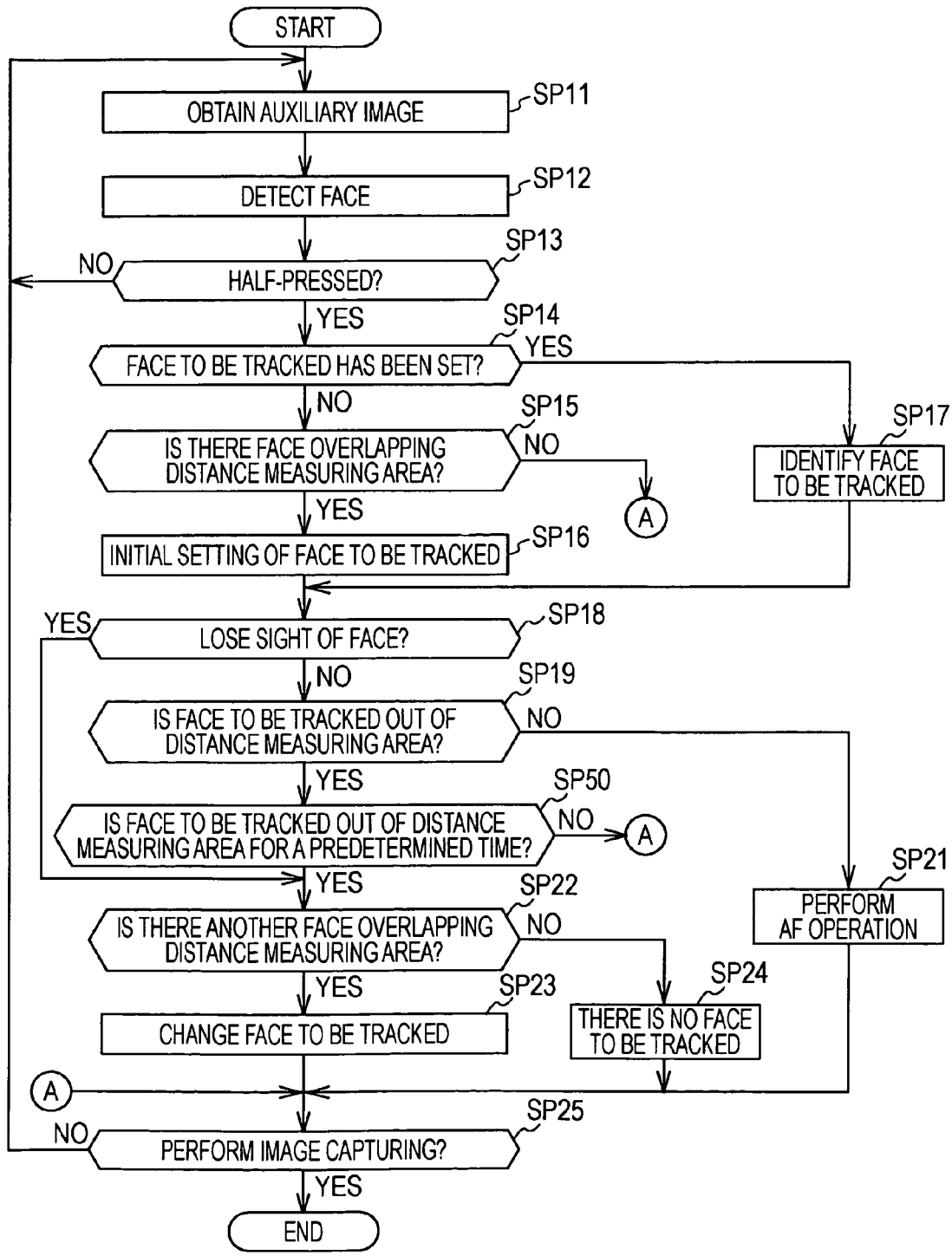
FIG. 14 is a flowchart showing the tracking AF operation of the image capturing apparatus according to a second embodiment.

Next, a second embodiment of the present invention will be described. In an image capturing apparatus 1B according to the second embodiment, an operation performed when the face to be tracked is out of the distance measuring area is different from that of the image capturing apparatus 1A according to the first embodiment. The image capturing apparatus 1B according to the second embodiment has approximately the same structures and functions (refer to FIGS. 1 to 5) as those of the image capturing apparatus 1A except for the above difference, and the same reference symbols are provided to the shared sections and description thereof is omitted. FIG. 14 is a flowchart showing the tracking AF operation of the image capturing apparatus 1B.

As shown in FIG. 14, in the image capturing apparatus 1B, the same operations as those of the image capturing apparatus 1A are performed from step SP11 to step SP18. To put it simply, a face of a person is detected from the auxiliary image which becomes the live view image, and the face to be tracked is set or identified from the detected faces. In step SP18, it is determined whether or not the sight of the face to be tracked is lost in the auxiliary images which are continuously obtained. When the sight of the face to be tracked is lost, the operation process moves to step SP22, and when the sight of the face to be tracked is not lost, the operation process moves to step SP19.

In step SP19, whether or not the face to be tracked is out of the distance measuring area is determined by the overlap determination section 125 (refer to FIG. 5).

When the face to be tracked is not determined to be out of the distance measuring area in step SP19, the operation process moves to step SP21, and the AF operation to focus the face to be tracked is performed.

On the other hand, when the face to be tracked is determined to be out of the distance measuring area in step SP19, the operation process moves to step SP50.

In step SP50, whether or not the state in which the face to be tracked is out of the distance measuring area continues for a predetermined time period is determined by the overlap determination section 125. Specifically, in the auxiliary images obtained sequentially in time series, it is determined whether or not the state in which the face to be tracked is not present in the distance measuring area continues for more than a predetermined time period set in advance.

When the face to be tracked is determined to be out of the distance measuring area for the predetermined time period in step SP50, the face to be tracked is defined to be not present in the distance measuring area, and the operation process moves to step SP22. Thereafter the processing for changing the face to be tracked (step SP23), or the processing for canceling the setting of the face to be tracked is performed (step SP24), and then the operation process moves to step SP25.

On the other hand, when the face to be tracked is determined not to be out of the distance measuring area for the predetermined time period in step SP50, the operation process moves to step SP25 without changing the face to be tracked or canceling the setting of the face to be tracked. In this way, in the image capturing apparatus 1B, even when the face to be tracked is determined to be out of the distance measuring area, the same face is continuously tracked from when the face to be tracked goes out of the distance measuring area until a predetermined time period passes (in other words, the setting of the face to be tracked is maintained).

In step SP25, it is determined whether or not to start the image capturing operation in accordance with the pressing state of the release button 11. When starting the image capturing operation, the tracking AF operation is ended, and when not starting the image capturing operation, the tracking AF operation is repeatedly performed on the auxiliary images obtained repeatedly in time series.

In the tracking AF operation, even when the face to be tracked goes out of the distance measuring area by, for example, involuntary hand jiggling or the like, the possibility that the face to be tracked enters the distance measuring area again is high. Therefore, like the image capturing apparatus 1B, by continuously tracking the same face to be tracked for a predetermined time period even when the face to be tracked once goes out of the distance measuring area, the possibility that an operation which the user does not intend such as ending the tracking AF operation or changing the face to be tracked is performed can be decreased, and consequently the possibility that the tracking AF operation to focus the specific subject is able to be continued can be increased.

3. Modified Examples

Although the embodiments of the present invention have been described so far, the present invention is not limited to the above described description.

Figure 15:
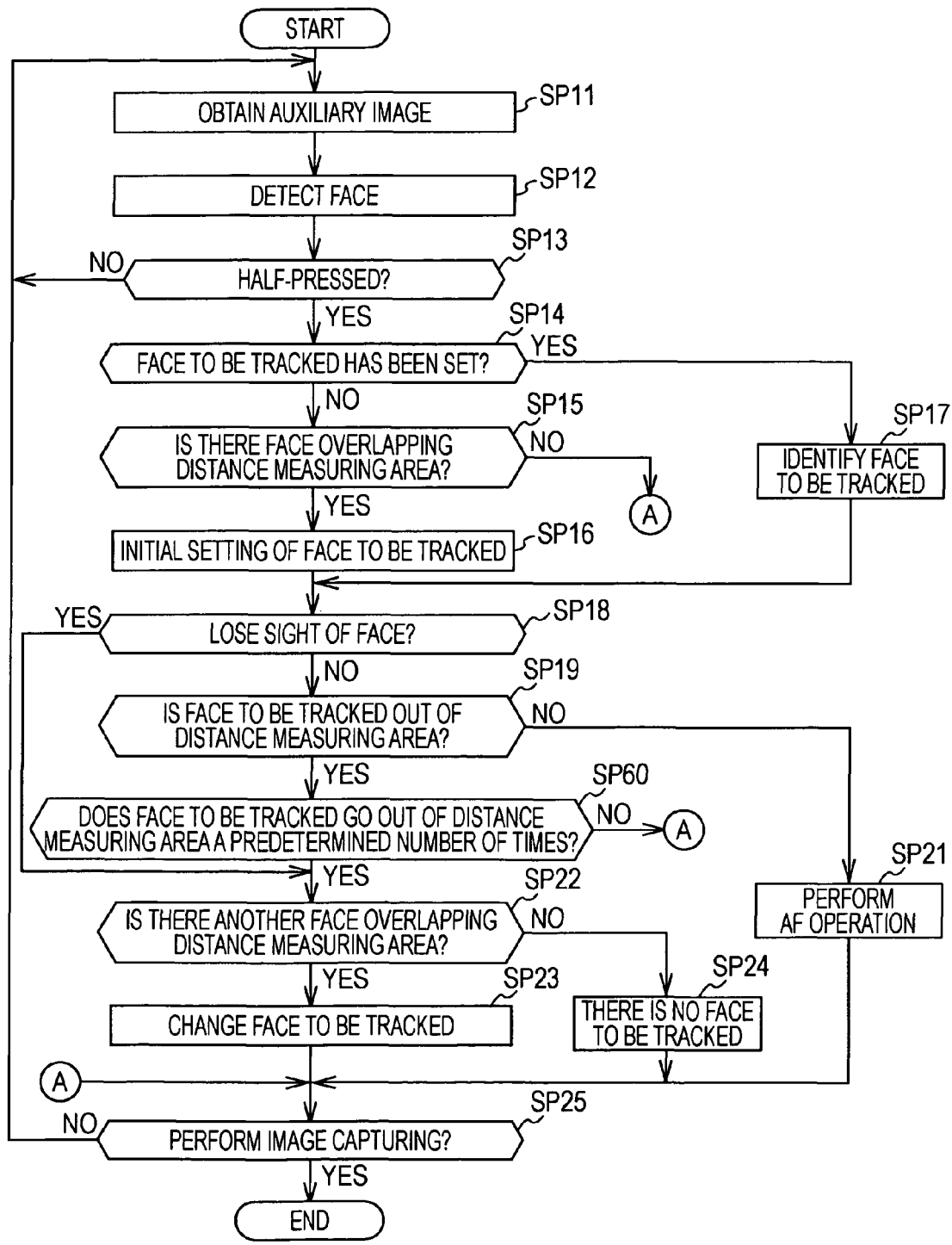
FIG. 15 is a flowchart showing the tracking AF operation of the image capturing apparatus according to a modified example.

For example, although, in the above described second embodiment, when the face to be tracked is determined to be out of the distance measuring area, the same face is continuously tracked from when the face to be tracked goes out of the distance measuring area until a predetermined time period passes, the present invention is not limited to this. FIG. 15 is a flowchart showing the tracking AF operation of the image capturing apparatus 1C according to a modified example.

Specifically, as shown in FIG. 15, in an image capturing apparatus 1C, when the face to be tracked is determined to be out of the distance measuring area in step SP19, the operation process moves to step SP60.

In step SP60, whether or not the face to be tracked goes out of the distance measuring area a predetermined number of times is determined by the overlap determination section 125. Specifically, in the overlap determination section 125, every time the face to be tracked goes out of the distance measuring area, in other words, every time the state that the face to be tracked is not present in the distance measuring area (also referred to as "non-present state") is detected, the non-present state is counted. It is determined whether or not the total number of the detected non-present states reaches a predetermined number of times set in advance.

When the face to be tracked is determined to go out of the distance measuring area the predetermined number of times in step SP60, the face to be tracked is defined to be not present in the distance measuring area, and the operation process moves to step SP22. Thereafter the processing for changing the face to be tracked (step SP23), or the processing for canceling the setting of the face to be tracked (step SP24) is performed, and then the operation process moves to step SP25.

On the other hand, when the face to be tracked is determined not to go out of the distance measuring area the predetermined number of times in step SP60, the operation process moves to step SP25 without changing the face to be tracked or canceling the setting of the face to be tracked.

In this way, the image capturing apparatus 1C detects the non-present state in which the face to be tracked is not present in the distance measuring area in each auxiliary image in which the face to be tracked is detected, and when the non-present state is detected the predetermined number of times, it is determined that the face to be tracked is not present in the distance measuring area. Therefore, even when the face to be tracked once goes out of the distance measuring area, the same face can be continuously tracked until the face to be tracked goes out of the distance measuring area the predetermined number of times. In this way, the possibility that an operation which the user does not intend such as ending the tracking AF operation or changing the face to be tracked is performed can be decreased, and consequently the possibility that the tracking AF operation to focus the specific subject is able to be continued can be increased.

Figure 16:
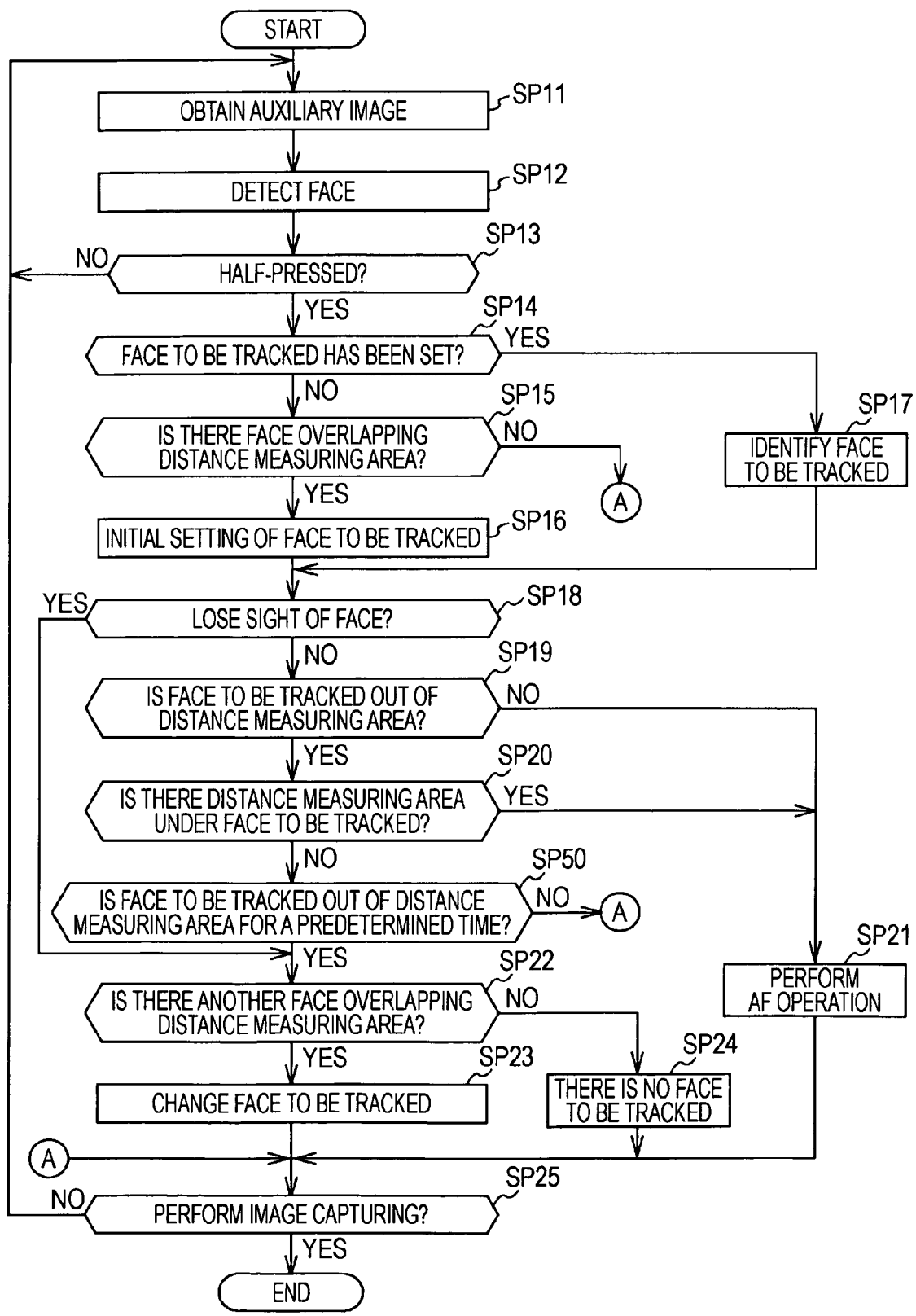
FIG. 16 is a flowchart showing the tracking AF operation of the image capturing apparatus according to a modified example.

The tracking AF operation of the image capturing apparatus 1A according to the first embodiment and the tracking AF operation of the image capturing apparatus 1B according to the second embodiment may be combined. FIG. 16 is a flowchart showing the tracking AF operation of the image capturing apparatus 1D according to a modified example.

Specifically, as shown in FIG. 16, in an image capturing apparatus 1D, when the face to be tracked is determined to be out of the distance measuring area in step SP19, the operation process moves to step SP20.

In step SP20, whether the distance measuring area is present or not under the face to be tracked is determined. When the distance measuring area is determined to be present under the face to be tracked in step SP20, the operation process moves to step SP21 without changing the face to be tracked, and the AF operation is performed.

On the other hand, when the distance measuring area is determined not to be present under the face to be tracked in step SP20, the operation process moves to step SP50.

In step SP50, whether or not the face to be tracked is out of the distance measuring area for a predetermined time period is determined by the overlap determination section 125.

When the face to be tracked is determined to be out of the distance measuring area for the predetermined time period in step SP50, the operation process moves to step SP22, the processing for changing the face to be tracked (step SP23) or the processing for canceling the setting of the face to be tracked (step SP24) is performed, and then the operation process moves to step SP25.

On the other hand, when the face to be tracked is determined not to be out of the distance measuring area for the predetermined time period in step SP50, the operation process moves to step SP25 without changing the face to be tracked or canceling the setting of the face to be tracked.

In this way, by combining the tracking AF operation of the image capturing apparatus 1A and the tracking AF operation of the image capturing apparatus 1B, the possibility that an operation which the user does not intend such as ending the tracking AF operation or changing the face to be tracked is performed can be further decreased, and the possibility that the tracking AF operation to focus the specific subject is able to be continued can be further increased.

Since the image capturing apparatus 1C is a modified example of the image capturing apparatus 1B, the tracking AF operation of the image capturing apparatus 1A and the tracking AF operation of the image capturing apparatus 1C can be combined. A flowchart showing the tracking AF operation of an image capturing apparatus 1E according to the combination is as shown in FIG. 17.

Figure 17:
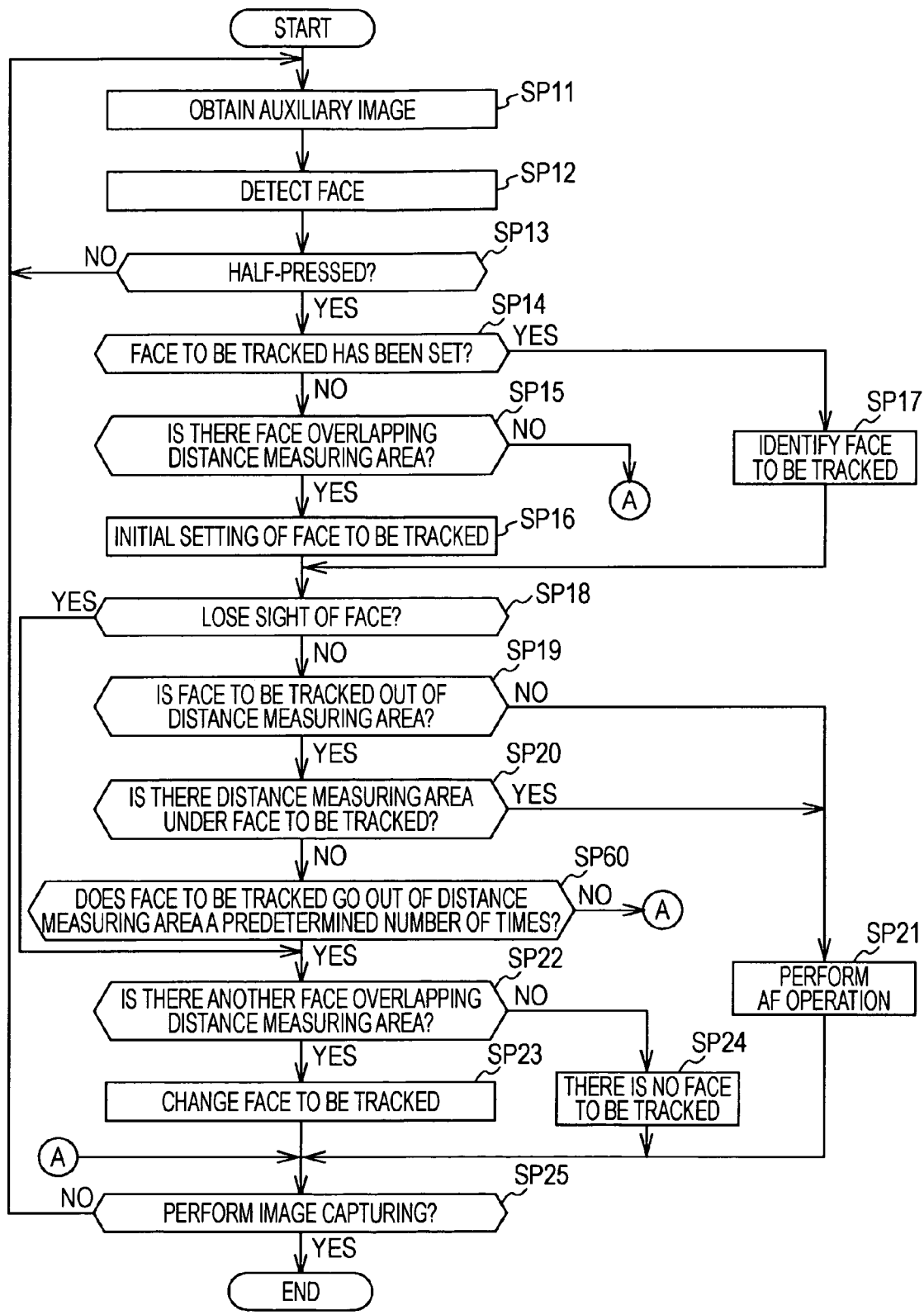
FIG. 17 is a flowchart showing the tracking AF operation of the image capturing apparatus according to a modified example.

Specifically, as shown in FIG. 17, in the image capturing apparatus 1E, when the face to be tracked is determined to be out of the distance measuring area in step SP19, the operation process moves to step SP20.

In step SP20, whether or not the distance measuring area is present under the face to be tracked is determined. When the distance measuring area is determined to be present under the face to be tracked in step SP20, the operation process moves to step SP21 without changing the face to be tracked, and the AF operation is performed.

On the other hand, when the distance measuring area is determined not to be present under the face to be tracked in step SP20, the operation process moves to step SP60.

In step SP60, whether or not the face to be tracked goes out of the distance measuring area a predetermined number of times is determined by the overlap determination section 125.

When the face to be tracked is determined to go out of the distance measuring area the predetermined number of times in step SP60, the operation process moves to step SP22, the processing for changing the face to be tracked (step SP23) or the processing for canceling the setting of the face to be tracked (step SP24) is performed, and then the operation process moves to step SP25.

On the other hand, when the face to be tracked is determined not to be out of the distance measuring area the predetermined number of times in step SP60, the operation process moves to step SP25 without changing the face to be tracked or canceling the setting of the face to be tracked.

In this way, by combining the tracking AF operation of the image capturing apparatus 1A and the tracking AF operation of the image capturing apparatus 1C, the possibility that an operation which the user does not intend such as ending the tracking AF operation or changing the face to be tracked is performed can be further decreased, and the possibility that the tracking AF operation to focus the specific subject is able to be continued can be further increased.

Although, in the above embodiment, the initial setting of the face to be tracked is performed automatically by the object-to-be-tracked setting section 124, the present invention is not limited to this.

Specifically, the initial setting of the face to be tracked may be performed manually by a user operation. When manually performing the initial setting of the face to be tracked, the object-to-be-tracked setting section 124 sets an object selected by the user in the image to be captured as the object to be tracked.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing apparatus comprising:
   an image sensor configured to obtain a captured image of a subject image;
   a face detection section configured to detect a face of a subject from the captured image;
   a focusing control section configured to perform a tracking focusing operation for maintaining a state in which the face of the subject is focused on the basis of a phase difference detection signal obtained from a distance measuring area provided in an image capturing area;
   a first determination section configured to determine whether or not the face of the subject is present in the distance measuring area when the face of the subject is detected by the face detection section;
   a second determination section configured to determine whether or not a body area in which a body corresponding to the face of the subject is expected to be present is present in the distance measuring area when the face of the subject is determined not to be present in the distance measuring area by the first determination section; and
   a display control section configured to display a live view image on the basis of the captured images obtained sequentially by the image sensor,
   wherein the focusing control section
   performs the tracking focusing operation on the basis of the phase difference detection signal obtained from the distance measuring area in which the face of the subject is determined to be present when the face of the subject is determined to be present in the distance measuring area by the first determination section, and
   performs the tracking focusing operation on the basis of the phase difference detection signal obtained from the distance measuring area in which the body area is determined to be present when the body area is determined to be present in the distance measuring area by the second determination section when the face of the subject is determined not to be present in the distance measuring area by the first determination section, and
   wherein, when the tracking focusing operation is performed by the focusing control section on the basis of the phase difference detection signal obtained from the distance measuring area in which the body area is determined to be present, the display control section superimposes the distance measuring area in which the body area is determined to be present on the live view image and displays the live view image.

2. The image capturing apparatus according to claim 1, wherein, when a state in which the face of the subject is not present in the distance measuring area is continued for a predetermined time period, the first determination section determines that the face of the subject is not present in the distance measuring area.

3. The image capturing apparatus according to claim 1, wherein, every time a non-present state in which the face of the subject is not present in the distance measuring area is detected in the captured images in which the face of the subject is detected by the face detection section, the first determination section counts the non-present state, and determines that the face of the subject is not present in the distance measuring area when the non-present states are detected a predetermined number of times.

4. A control method of an image capturing apparatus, the method comprising the steps of:
   (a) obtaining a captured image of a subject image by an image sensor;
   (b) detecting a face of a subject from the captured image;
   (c) determining whether or not the face of the subject is present in a distance measuring area when the face of the subject is detected in the step (b);
   (d) determining whether or not a body area in which a body corresponding to the face of the subject is expected to be present is present in the distance measuring area when the face of the subject is determined not to be present in the distance measuring area in the step (c);
   (e) displaying a live view image on the basis of the captured images obtained sequentially by the image sensor;
   (f) performing a tracking focusing operation for maintaining a state in which the face of the subject is focused on the basis of a phase difference detection signal obtained from the distance measuring area in which the face of the subject is determined to be present when the face of the subject is determined to be present in the distance measuring area in the step (c);
   (g) performing the tracking focusing operation on the basis of a phase difference detection signal obtained from the distance measuring area in which the body area is determined to be present when the body area is determined to be present in the distance measuring area in the step (d) when the face of the subject is determined not to be present in the distance measuring area in the step (c); and
   (h) when the tracking focusing operation is performed on the basis of the phase difference detection signal obtained from the distance measuring area in which the body area is determined to be present, superimposing the distance measuring area in which the body area is determined to be present on the live view image.

5. A non-transitory computer-readable medium having stored thereon a computer-readable program, the program causing a computer installed in an image capturing apparatus to perform the steps of:
- (a) obtaining a captured image of a subject image by an image sensor;
- (b) detecting a face of a subject from the captured image;
- (c) determining whether or not the face of the subject is present in a distance measuring area when the face of the subject is detected in the step (b);
- (d) determining whether or not a body area in which a body corresponding to the face of the subject is expected to be present is present in the distance measuring area when the face of the subject is determined not to be present in the distance measuring area in the step (c);
- (e) displaying a live view image on the basis of the captured images obtained sequentially by the image sensor;
- (f) performing a tracking focusing operation for maintaining a state in which the face of the subject is focused on the basis of a phase difference detection signal obtained from the distance measuring area in which the face of the subject is determined to be present when the face of the subject is determined to be present in the distance measuring area in the step (c); and
- (g) performing the tracking focusing operation on the basis of a phase difference detection signal obtained from the distance measuring area in which the body area is determined to be present when the body area is determined to be present in the distance measuring area in the step (d) when the face of the subject is determined not to be present in the distance measuring area in the step (c); and
- (h) when the tracking focusing operation is performed on the basis of the phase difference detection signal obtained from the distance measuring area in which the body area is determined to be present, superimposing the distance measuring area in which the body area is determined to be present on the live view image.

* * * * *